United States Patent [19]

Gareis et al.

[11] Patent Number: 4,568,824

[45] Date of Patent: Feb. 4, 1986

[54] FORGERY-PROOF INFORMATION CARRIER

[75] Inventors: Raimo Gareis, Odenthal-Gloebusch; Fritz Kirstein, Cologne, both of Fed. Rep. of Germany

[73] Assignee: Agfa-Gevaert Aktiengesellschaft, Leverkusen, Fed. Rep. of Germany

[21] Appl. No.: 471,758

[22] Filed: Mar. 3, 1983

[30] Foreign Application Priority Data

Mar. 13, 1982 [DE] Fed. Rep. of Germany ....... 3209273

[51] Int. Cl.⁴ ............................................. G06K 19/00

[52] U.S. Cl. ..................................... 235/487; 235/488

[58] Field of Search .................. 235/488, 487; 283/88; 40/27

[56] References Cited

U.S. PATENT DOCUMENTS

| | | | |
|---|---|---|---|
| 1,312,215 | 8/1919 | Spaulding | 40/27 |
| 2,397,272 | 3/1946 | Land | 283/90 |
| 2,545,505 | 3/1951 | Wall | 40/27 |
| 3,279,826 | 10/1966 | Rudershausen | 235/488 |
| 3,313,052 | 4/1967 | Malster | 283/90 |
| 3,662,156 | 5/1972 | Grosbard | 235/488 |
| 3,731,085 | 5/1973 | Bostrom . | |
| 4,119,361 | 10/1978 | Greenaway | 283/88 |
| 4,330,350 | 5/1982 | Andrews . | |

*Primary Examiner*—Harold I. Pitts

*Attorney, Agent, or Firm*—Connolly and Hutz

[57] ABSTRACT

A forgery-proof information carrier comprises an insert (1) having a passport photo (7), data about the owner and other security features, and plastics films (5, 6) which are joined in an undetachable manner to the insert (1), and is distinguished in that a metal mask (2) is provided as an edge protection at least in the region of the edges of the information carrier. In a further development to increase the security against forgeries, the metal mask (2) may be inwardly provided with irregular edges (3) or with openings (4).

6 Claims, 4 Drawing Figures

FORGERY-PROOF INFORMATION CARRIER

BACKGROUND OF THE INVENTION

1. Field of the Invention

This invention relates to a forgery-proof information carrier, for example an indentity card (ID card), a bank card or a permit card which contains in an unbreakable bond between two plastics films an insert with a passport photo, data about the owner and different security features.

2. Description of the Prior Art

It is known to provide documents, such as an ID card insert, with passport photos, signatures and fingerprints and to then weld the documents between films.

In order to prevent passport photos which have been inserted from being exchanged, the insert may be made of a piece of special photographic paper, on the layers of which the data of the card owner and the passport photo are exposed and developed. The insert may then be provided with additional identification features, for example with line print or autotypy, and is finally welded between films.

It is known from German Auslegeschrift No. 2,631,246 to provide documents, such as identity cards, permit cards and the like, with permanent magnets, magnetic sheets, magnetic tapes or metal sheets. These devices may be used to open a magnetic lock or to operate a switch. U.S. Pat. No. 4,066,873 describes the insertion into such documents of magnetic strips which contain coded magnetic information, and a printed binary code is simultaneously provided for an optical inquiry.

This and a number of similar known types of production of information carriers have the disadvantage that the outer edges of the carriers are not adequately protected, so that they may be easily damaged by mechanical stresses (for example when they are used for scraping off ice from car windows). This may render the information carrier unuseable, particularly if the information is intended to be read mechanically and the spacing of the information to the edge of the card is changed by a strain on the edges.

The object of the present invention is to provide an information carrier which affords a high degree of security against forgeries and the edge stability of which is improved such that even if the edges are subjected to a considerable mechanical stress, the machine-readability of the data in different identification reading devices is still ensured.

The object is achieved according to the present invention for an information carrier of the initially-mentioned type in that a metal insert is provided at least in the region of the edges of the information carrier.

The metal insert protects the edges of the information carrier in a surprisingly simple manner against wear, because the metal of the metal insert offers substantially more resistance to a mechanical stress compared to the hitherto conventional plastics edges of information carriers. The metal edge ensures a reliable insertion of the carrier into the reading device and thus ensures the undisturbed readability of the data by the information reading device. Moreover, the information is more stable as a result of the metal insert and, as shown below, is more secure against forgeries.

In a preferred embodiment, the metal insert is a metal mask which is positioned along the edges of the information carrier. The metal mask or insert may be produced from any metal. Good results with respect to the mechanical resistance are provided by a sheet steel mask, which also has financial advantages. The thickness of the mask is generally comparable with that of the insert. However, it may also be clearly lower in some forms of use. If forgery of the information carrier is to be more difficult, then more unusual metals or metal alloys may be used as a metal mask. The mask may also be used as another security feature if it has certain magnetic or electrical property, for example a certain coercive force, a certain capacitance or a certain resistance.

In an advantageous further development, the metal mask is designed to be outwardly flush with the edges of the information carrier and its inside edges are irregular or jagged, as a result of which it becomes much more difficult to open the welded or bonded carrier for forgery purposes.

Another further development of the metal insert or mask is distinguished in that the metal insert or mask is provided with bores, through which the top plastics film is joined to the bottom plastics film by bonding or welding. The join between the insert, the metal insert or mask and the two protective films is improved by this measure and any attempt at forgery is further complicated.

BRIEF DESCRIPTION OF THE DRAWING

Embodiments of the present invention will be described in more detail in the following with reference to drawings, wherein.

DESCRIPTION OF THE PREFERRED EMBODIMENT

Figure 1:
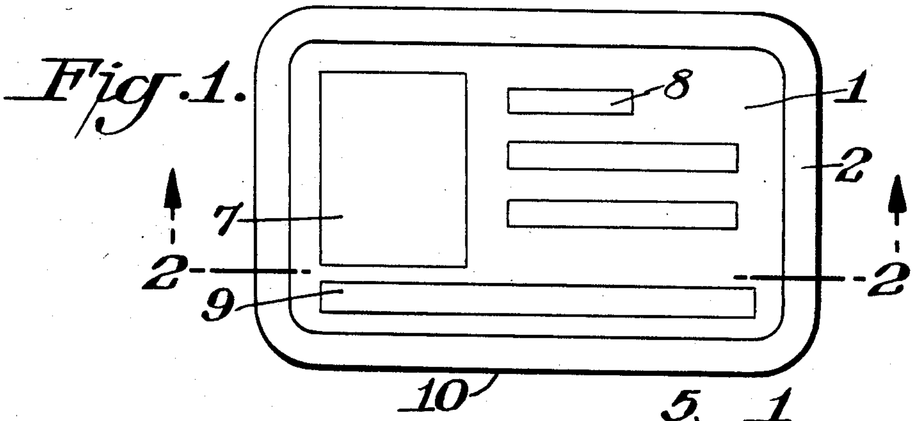
FIG. 1 is a top view of an information carrier having a metal mask.

FIG. 1 illustrates in a top view an information carrier, the insert 1 of which contains one panel 7 for a passport photo or a photograph, and on which carrier panels 8 are positioned for the personal data of the card owner and one panel 9 is provided along one edge of the carrier. The inserted sheet is surround by a metal mask 2 and is welded or bonded between plastics films 5, 6 together with the mask (FIG. 2).

Figure 2:
FIG. 2 is a cross section through the information carrier according to FIG. 1.

FIG. 2 is a cross section through the information carrier according to FIG. 1, the material thickness being illustrated in an enlarged view.

The insert 1 lies between plastics films 5 and 6 and is joined thereto in an undetachable manner. A metal mask 2 is positioned around the insert 1 and it protects the edges of the carrier against mechanical wear and guarantees that the spacing between the edge 10 and the field 9 remains virtually unchanged for mechanically-readable data, even if the identity card is used for purposes other than those originally intended. The metal mask 2 is also inserted between the films 5, 6 and is joined thereto in an undetachable manner, so that the information carrier advantageously forms a stable fixed unit of a constant thickness over the complete surface. Of course, embodiments are also possible in which the insert 1 is the same size as the information carrier and the metal mask is introduced into the insert 1 or is bonded onto the insert (not shown) in FIGS. 1 and 2 but described further below.

Figure 3:
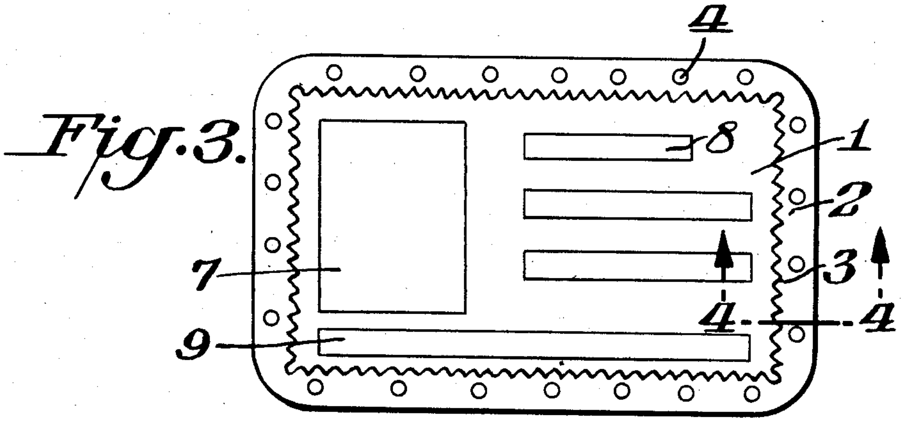
FIG. 3 shows specific embodiments of the metal mask in an information carrier.
Figure 4:
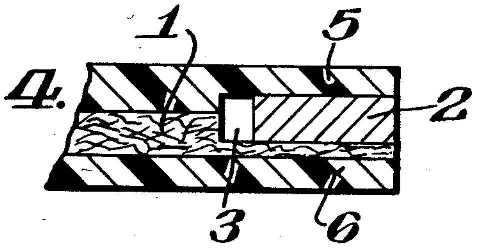
FIG. 4 is a cross section having an embedded metal mask.

FIG. 3 illustrates an advantageous further development of the information carrier according to FIG. 2, in which the metal mask performs the task of increasing the security against forgeries, in addition to strengthening the edges. As shown, the metal mask has smooth outer edges to protect against mechanical abrasion. The inside edges of the mask positioned towards the insert are provided with teeth 3 or irregular shapes which project into the insert 1. The edges of the insert 1 may be stamped out so that they fit the mask 2 if the mask is as thick as the insert 1 (FIG. 2). The insert 1 may also have smooth edges and the mask 2 may be bonded onto the insert. By stamping the information carrier under pressure and heat, the teeth 3 penetrate into the insert 1 and into the plastics film 5 (or 6), so that a card of the same thickness is again produced (FIG. 4), the metal mask being pressed into two layers, namely the film 5 and the insert 1, so that it is no longer possible to open the card by separating the layers for forgery purposes.

Another advantageous improvement in the information carrier is obtained by providing the metal insert or mask with bores or holes 4 (FIG. 3). When the films 5, 6 are bonded or welded together with the insert 1 and the metal insert 2, the top film 5 is firmly joined to the bottom film 6 through these holes. This measure increases the rigidity and strength of the information carrier and, at the same time, would make an attempted forgery much more difficult. The combination of the inwardly directed teeth 3 and the encirculating holes 4 in the metal mask, both measures being provided simultaneously (as illustrated in FIG. 3) considerably increases the security of the information carrier against forgery attempts.

In addition to these security features defined by shape, the characteristics of the metal mask 2 may also be used to check the authenticity of information carriers. The mask 2 may be magnetic, may have a certain electrical resistance, may absorb a certain electrical charge or may be made of a certain alloy which is difficult to reproduce. The teeth 3 and/or holes 4 may have specific irregular spacings from each other, from which a code may be read inductively when the card is moved through a test device and may be compared electronically with a test code, it still being possible for the data in field 9 to be read simultaneously.

We claim:

1. In a forgery-proof multilayer information carrier comprising the combination of
- an insert sheet,
- means on said sheet for providing information,
- a metal mask member juxtaposed with said sheet to adjoin and surround the periphery of said sheet;
- and a pair of layers comprised of plastic films
- each of said layers being bonded to one of the planar surfaces of said sheet and of said juxtaposed mask member
- whereby said sheet and mask member are interpositioned between said layers
- said card being so constructed and arranged that the card is provided rigidity and strength.

2. An information carrier according to claim 1, characterised in that the metal mask terminates outwardly in a flush manner with the edges of the information carrier and has jagged or irregularly formed inside edges.

3. An information carrier according to claim 1, characterised in that the metal mask is provided with openings, through which a top plastics film is joined to a bottom plastics film by bonding or welding.

4. An information carrier according to claim 1, characterised in that the metal mask has a thickness corresponding to that of the insert sheet and it joins the periphery of the insert sheet in an exactly fitting manner.

5. An information carrier according to claim 1, characterised in that the metal mask is thinner than the insert sheet, covers the periphery of the insert and is joined to the insert and/or is imprinted therein.

6. In an information carrier
- comprising a pair of plastic films bonded together and an information carrying member interpositioned between the bonded together films
- the combination of
- an insert sheet penetrable under pressure,
- means on said sheet for providing information
- a metal mask member interposed between said films
- and having an edge inward of said card defining an aperture into which said sheet is juxtaposed so that the mask surrounds the sheet,
- teeth on said inward edge penetrating said adjoining sheet,
- and a layer composed of a plastic film attached on each side of said combination whereby the sheet and mask member are joined in an undetachable manner to the plastic films.

* * * * *